(12) United States Patent
Teo

(10) Patent No.: US 6,215,494 B1
(45) Date of Patent: Apr. 10, 2001

(54) METHOD AND SYSTEM FOR CENTERING IMAGE OBJECTS

(75) Inventor: Patrick Cheng-San Teo, Redwood City, CA (US)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 08/992,994

(22) Filed: Dec. 18, 1997

(51) Int. Cl.[7] .................................................. G06T 17/00
(52) U.S. Cl. ........................... 345/418; 345/419; 382/288
(58) Field of Search ..................................... 345/418, 419; 382/288, 289, 291, 103

(56) References Cited

U.S. PATENT DOCUMENTS

| 5,014,126 | * | 5/1991  | Pritchard et al. ................ 358/91 |
| 5,090,038 | * | 2/1992  | Asahina ............................. 378/41 |
| 5,751,843 | * | 5/1998  | Maggioni et al. ................. 382/291 |
| 5,778,107 | * | 7/1998  | Kataoka ............................ 382/291 |
| 5,825,997 | * | 10/1998 | Yamada et al. ................... 345/419 |
| 5,835,640 | * | 11/1998 | Clements ......................... 382/289 |
| 5,854,852 | * | 12/1998 | Csipkes et al. .................... 382/288 |
| 5,862,249 | * | 1/1999  | Jang et al. ........................ 382/288 |
| 5,905,580 | * | 5/1999  | Cok et al. ......................... 382/289 |

* cited by examiner

Primary Examiner—Cliff N. Vo
(74) Attorney, Agent, or Firm—Blakely, Sokoloff, Taylor & Zafman

(57) ABSTRACT

A method for centering a plurality of images which are snapshots of an object seen at a plurality of orientations, including computing modification parameters for the images, and modifying the images based upon the modification parameters using a computer.

21 Claims, 5 Drawing Sheets

METHOD AND SYSTEM FOR CENTERING IMAGE OBJECTS

FIELD OF THE INVENTION

The present invention relates to the viewing of movies of objects on a computer display.

BACKGROUND OF THE INVENTION

An image object or object movie is a sequence of images of a three-dimensional object. Each image is a snapshot of an orientation of the object from a viewpoint. Production of an object movie entails acquiring or generating the sequence of images. This is typically done either by means of a camera which photographs the object from different viewpoints, or by means of a computer which renders synthetic images by simulating a camera. For computerized viewing of the object movie it is necessary that the images be in digital form. Thus if the camera used is not a digital camera, it is also necessary to digitize the images photographed, for download to a computer. Digitization is typically done through use of a scanner.

The simplest object movie consists of a sequence of images of the object acquired by photographing the object from different viewpoints encircling it. Equivalently, the same sequence of images can be photographed from a fixed viewpoint, but with the object in different orientations. For example, the object could be rotating on a turntable. The latter is a more common acquisition method.

Once acquired (and digitized, if necessary) and downloaded to a computer, the images comprising an object movie can then be displayed in sequence on a computer monitor in response to user input commands, in such a way that it appears that the user is manipulating the object.

During image acquisition, the tilt (i.e., elevation angle) of the physical or computer-simulated camera need not be horizontal with respect to the ground plane on which the object is resting, nor need it be constant. Several rotating sequences of photographs of an object taken with the camera at different tilt angles can be combined to provide the user with an experience of being able to rotate and tilt the object, thus providing an extra degree of freedom.

It is not necessary that the images reside on the user's computer. In fact, current client/server Internet applications operate by storing the images on a server computer, and allowing a user to interactively view the object movie on a client computer. The server computer sends to the client computer via the Internet whatever data is necessary for the client computer to be able to display the image requested by the user, in response to interactive user commands.

Systems for interactive viewing of object movies over the Internet are described in co-pending U.S. patent applications: Ser. No. 08/788,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION; Ser. No. 08/813,181, filed Mar. 7, 1997 and entitled METHOD AND SYSTEM FOR ENCODING MOVIES, PANORAMAS AND LARGE IMAGES FOR ON-LINE INTERACTIVE VIEWING AND GAZING; and Ser. No. 08/850,690, filed May 2, 1997 and entitled A METHOD AND SYSTEM FOR PROVIDING ON-LINE INTERACTIVITY OVER A SERVER-CLIENT NETWORK. The contents of the patent applications referred to in this paragraph are all hereby incorporated by reference.

SUMMARY OF THE INVENTION

When an object movie producer acquires a sequence of images of a three-dimensional object, a difficulty arises in ensuring that the images are well centered. Centering involves careful orientation of the object or the camera as the various snapshots are taken, which can be hard to achieve. Often the producer cannot preview the final object movie during image acquisition, and has minimal feedback during acquisition for re-adjusting or fine-tuning the placement of the object or the position of the camera. Although each individual snapshot can typically be previewed, the relative alignment of the snapshots to one another may not be previewable, and is hard to control.

Moreover, the physical configuration and mass distribution of the object can prevent it from being oriented as desired, in which case the producer is prevented from positioning the object in its desired placement.

The present invention provides an efficient image-based method for re-rendering of a sequence of images which were acquired during production of an object movie, so as to enable the producer to center the images. The invention is particularly useful as it does not require the producer to re-acquire the sequence of images, nor does it require sophisticated three-dimensional modeling. Moreover, it is implementable in a way that carries out the re-rendering very quickly, in real time or near real time on today's standard computer processors.

In one embodiment of the present invention, the re-rendering involves translating and magnifying the images so as to center them about a desired axis. Translating involves shifting the pixel values of the image horizontally and vertically. Since the object typically has a simple background, the area where the translated or shifted image leaves the bounds of the original image can be filled in with background color values. Magnification involves zooming in or out of the image, according to a scale factor. Zooming in to a specified image is accomplished by enlarging a desired sub-portion of the specified image to the size of the specified image. Zooming out of a specified image is accomplished by reducing a larger image that contains the specified image to the size of the specified image. Again, the part of the larger image that lies outside the specified image can be filled in with background color values.

In an alternate embodiment of the present invention re-rendering can also involve modifications to the images of types other than translation and magnification, such as warping and projection.

In addition some of the images in the sequence can be discarded, if they cannot be centered together with the others.

There is thus provided in accordance with a preferred embodiment of the present invention a method for centering a plurality of images which are snapshots of an object seen at a plurality of orientations, the method including computing modification parameters for the images, and modifying the images based upon the modification parameters using a computer.

Additionally in accordance with a preferred embodiment of the present invention the plurality of images are snapshots photographed by a camera from a plurality of viewpoints which encircle the object.

Moreover in accordance with a preferred embodiment of the present invention the plurality of images are snapshots photographed by a camera from a fixed viewpoint, with the object rotated at a plurality of angles of rotation.

Further in accordance with a preferred embodiment of the present invention the object is situated upon a turntable during image acquisition, the turntable being mounted upon an axle about which it is rotated at a plurality of angles, thereby effecting rotation of the object at a plurality of angles of rotation.

Still further in accordance with a preferred embodiment of the present invention the plurality of images are snapshots generated by a computer which simulates a camera.

Additionally in accordance with a preferred embodiment of the present invention the plurality of orientations are plural positions of the object as it is rotated about an axis of rotation.

Moreover in accordance with a preferred embodiment of the present invention the step of computing modification parameters is based upon position information for the axis of rotation.

Further in accordance with a preferred embodiment of the present invention the step of computing modification parameters is based upon angle information for the plurality of orientations.

Still further in accordance with a preferred embodiment of the present invention the step of computing modification parameters is based upon a tilt angle of the camera.

Additionally in accordance with a preferred embodiment of the present invention the tilt angle of the camera is manually specified by a user by means of a user interface.

Further in accordance with a preferred embodiment of the present invention the tilt angle of the camera is automatically computed by a computer.

Moreover in accordance with a preferred embodiment of the present invention the step of computing modification parameters is based upon an axis adjustment vector.

Further in accordance with a preferred embodiment of the present invention the step of computing modification parameters is based upon projected axis adjustment vectors for at least two of the plurality of images.

Still further in accordance with a preferred embodiment of the present invention the projected axis adjustment vectors are horizontal vectors.

Additionally in accordance with a preferred embodiment of the present invention the axis adjustment vector is manually set by a user by means of a user interface.

Further in accordance with a preferred embodiment of the present invention the axis adjustment vector is automatically computed by a computer.

Moreover in accordance with a preferred embodiment of the present invention the step of computing modification parameters includes calculating major and minor semi-axis lengths and a phase angle for a planar ellipse.

Further in accordance with a preferred embodiment of the present invention the step of computing modification parameters includes solving two equations for two unknowns.

Still further in accordance with a preferred embodiment of the present invention the step of computing modification parameters includes minimizing a sum of squared errors.

Additionally in accordance with a preferred embodiment of the present invention the modification parameters are translation vectors, and the modifying step translates the images by the translation vectors.

Moreover in accordance with a preferred embodiment of the present invention the modification parameters are zoom factors, and the modifying step magnifies the images by the zoom factors.

Further in accordance with a preferred embodiment of the present invention, the method also includes the step of discarding at least one of the images.

There is also provided in accordance with a preferred embodiment of the present invention a method for centering a plurality of images which are snapshots of an object seen at a plurality of orientations, the method including selecting a desired axis, and modifying the images based upon the desired axis using a computer.

Additionally in accordance with a preferred embodiment of the present invention the plurality of images are snapshots photographed by a camera from a plurality of viewpoints which encircle the object.

Moreover in accordance with a preferred embodiment of the present invention the plurality of images are snapshots photographed by a camera from a fixed viewpoint, with the object rotated at a plurality of angles of rotation.

Further in accordance with a preferred embodiment of the present invention the object is situated upon a turntable during image acquisition, the turntable being mounted upon an axle about which it is rotated at a plurality of angles, thereby effecting rotation of the object at a plurality of angles of rotation.

Still further in accordance with a preferred embodiment of the present invention the plurality of images are snapshots generated by a computer which simulates a camera.

Additionally in accordance with a preferred embodiment of the present invention the plurality of orientations are plural positions of the object as it is rotated about an axis of rotation.

Moreover in accordance with a preferred embodiment of the present invention the selecting step includes selecting desired positions for a projected axis in at least two of the images.

Further in accordance with a preferred embodiment of the present invention the selecting step includes adjusting a moveable axis by means of a user interface.

Still further in accordance with a preferred embodiment of the present invention the adjusting step is carried out by means of a cursor control device for the computer, such as a mouse.

Additionally in accordance with a preferred embodiment of the present invention the adjusting step is carried out by dragging a vertical line in the horizontal direction.

Further in accordance with a preferred embodiment of the present invention the selecting step is carried out automatically by a computer.

Moreover in accordance with a preferred embodiment of the present invention the method also includes specifying a tilt angle, and the modifying step is based upon the tilt angle.

Further in accordance with a preferred embodiment of the present invention the step of specifying a tilt angle is carried out by means of a user interface.

Still further in accordance with a preferred embodiment of the present invention the step of specifying a tilt angle is carried out by means of a cursor control device for the computer, such as a mouse.

Additionally in accordance with a preferred embodiment of the present invention the step of specifying a tilt angle is carried out by sliding a slider bar.

Further in accordance with a preferred embodiment of the present invention the step of specifying a tilt angle is carried out automatically by a computer.

Moreover in accordance with a preferred embodiment of the present invention the modifying step includes translating the plurality of images by translation vectors.

Further in accordance with a preferred embodiment of the present invention the modifying step includes magnifying the plurality of images by zoom factors.

Still further in accordance with a preferred embodiment of the present invention, the method also includes the step of discarding at least one of the images.

There is also provided in accordance with a preferred embodiment of the present invention a system for centering a plurality of images which are snapshots of an object seen at a plurality of orientations, the system including a processor for computing modification parameters for the images, and an image modifier for modifying the images based upon the modification parameters using a computer.

Additionally in accordance with a preferred embodiment of the present invention the plurality of images are snapshots photographed by a camera from a plurality of viewpoints which encircle the object.

Moreover in accordance with a preferred embodiment of the present invention the plurality of images are snapshots photographed by a camera from a fixed viewpoint, with the object rotated at a plurality of angles of rotation.

Further in accordance with a preferred embodiment of the present invention the object is situated upon a turntable during image acquisition, the turntable being mounted upon an axle about which it is rotated at a plurality of angles, thereby effecting rotation of the object at a plurality of angles of rotation.

Still further in accordance with a preferred embodiment of the present invention the plurality of images are snapshots generated by a computer which simulates a camera.

Additionally in accordance with a preferred embodiment of the present invention the plurality of orientations are plural positions of the object as it is rotated about an axis of rotation.

Moreover in accordance with a preferred embodiment of the present invention the processor uses position information for the axis of rotation.

Further in accordance with a preferred embodiment of the present invention the processor uses angle information for the plurality of orientations.

Still further in accordance with a preferred embodiment of the present invention the processor uses a tilt angle of the camera.

Additionally in accordance with a preferred embodiment of the present invention the tilt angle of the camera is manually specified by a user by means of a user interface.

Further in accordance with a preferred embodiment of the present invention the tilt angle of the camera is automatically computed by a computer.

Moreover in accordance with a preferred embodiment of the present invention the processor uses an axis adjustment vector.

Further in accordance with a preferred embodiment of the present invention the processor uses projected axis adjustment vectors for at least two of the plurality of images.

Still further in accordance with a preferred embodiment of the present invention the projected axis adjustment vectors are horizontal vectors.

Additionally in accordance with a preferred embodiment of the present invention the axis adjustment vector is manually set by a user by means of a user interface.

Further in accordance with a preferred embodiment of the present invention the axis adjustment vector is automatically computed by a computer.

Moreover in accordance with a preferred embodiment of the present invention the processor calculates major and minor semi-axis lengths and a phase angle for a planar ellipse.

Further in accordance with a preferred embodiment of the present invention the processor operates by solving two equations for two unknowns.

Still further in accordance with a preferred embodiment of the present invention the processor operates by minimizing a sum of squared errors.

Additionally in accordance with a preferred embodiment of the present invention the modification parameters are translation vectors, and the image modifier translates the images by the translation vectors.

Moreover in accordance with a preferred embodiment of the present invention the modification parameters are zoom factors, and the image modifier magnifies the images by the zoom factors.

Further in accordance with a preferred embodiment of the present invention, the system also includes an image selector for discarding at least one of the images.

There is also provided in accordance with a preferred embodiment of the present invention a system for centering a plurality of images which are snapshots of an object seen at a plurality of orientations, the system including an axis selector for selecting a desired axis, and an image modifier for modifying the images based upon the desired axis using a computer.

Additionally in accordance with a preferred embodiment of the present invention the plurality of images are snapshots photographed by a camera from a plurality of viewpoints which encircle the object.

Moreover in accordance with a preferred embodiment of the present invention the plurality of images are snapshots photographed by a camera from a fixed viewpoint, with the object rotated at a plurality of angles of rotation.

Further in accordance with a preferred embodiment of the present invention the object is situated upon a turntable during image acquisition, the turntable being mounted upon an axle about which it is rotated at a plurality of angles, thereby effecting rotation of the object at a plurality of angles of rotation.

Still further in accordance with a preferred embodiment of the present invention the plurality of images are snapshots generated by a computer which simulates a camera.

Additionally in accordance with a preferred embodiment of the present invention the plurality of orientations are plural positions of the object as it is rotated about an axis of rotation.

Further in accordance with a preferred embodiment of the present invention the axis selector selects desired positions for a projected axis in at least two of the images.

Still further in accordance with a preferred embodiment of the present invention the axis selector includes a user interface for adjusting a moveable axis.

Additionally in accordance with a preferred embodiment of the present invention the user interface includes a cursor control device for the computer, such as a mouse.

Moreover in accordance with a preferred embodiment of the present invention the cursor control device is used for dragging a vertical line in the horizontal direction.

Moreover in accordance with a preferred embodiment of the present invention the axis selector is automated by a computer.

Further in accordance with a preferred embodiment of the present invention the system also includes an angle specifier for specifying a tilt angle, and the image modifier modifies the images based upon the tilt angle.

Still further in accordance with a preferred embodiment of the present invention the angle specifier includes a user interface.

Additionally in accordance with a preferred embodiment of the present invention the user interface includes a cursor control device for the computer, such as a mouse.

Moreover in accordance with a preferred embodiment of the present invention the user interface includes a slider bar.

Additionally in accordance with a preferred embodiment of the present invention the angle specifier is automated by a computer.

Further in accordance with a preferred embodiment of the present invention the image modifier includes an image translator for translating the plurality of images by translation vectors.

Still further in accordance with a preferred embodiment of the present invention the image modifier includes an image magnifier for magnifying the plurality of images by zoom factors.

Further in accordance with a preferred embodiment of the present invention, the system also includes an image selector for discarding at least one of the images.

LIST OF APPENDICES

Figures 1A, 1B, 1C, 1D, 1E:
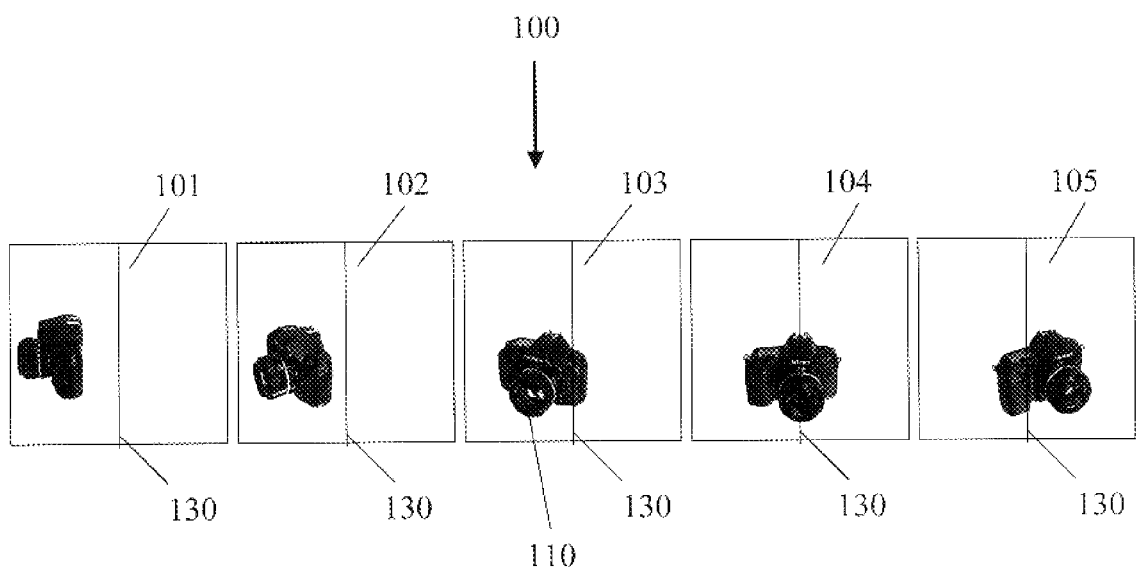
FIGS. 1A–1E illustrate a sequence of images of an object which are off-center due to poor positioning of the object.
Figures 2A, 2B, 2C, 2D, 2E:
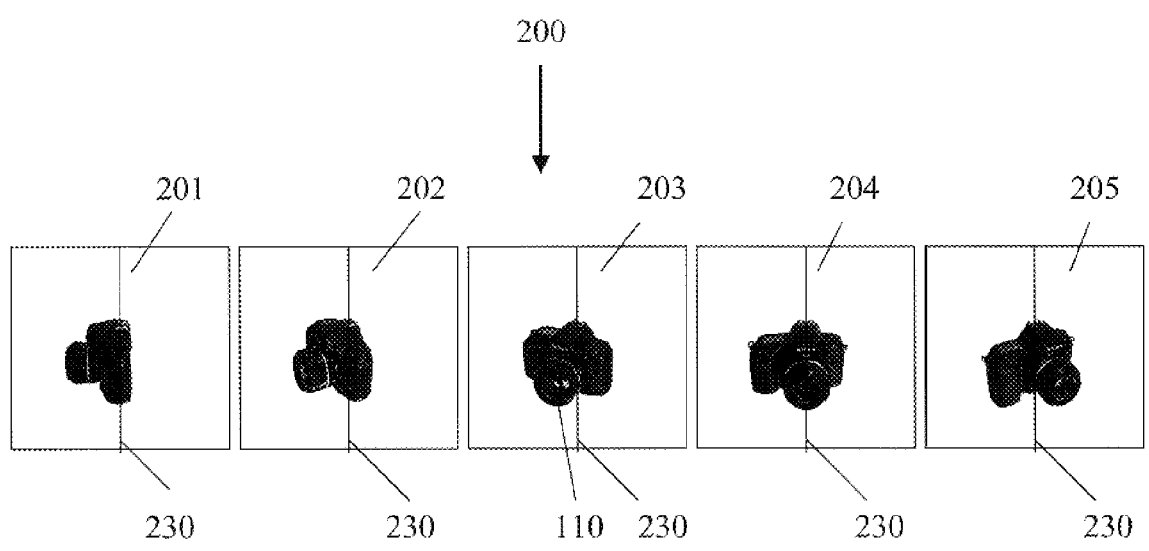
FIGS. 2A–2E illustrate a new sequence of images, created from the sequence in FIGS. 1A–1E using a preferred embodiment of the present invention, which are centered about a desired axis.

Appendix A is a listing of software in the C programming language for performing the image processing used to re-center a sequence of images of an object, in accordance with a preferred embodiment of the present invention.

DETAILED DESCRIPTION OF PREFERRED EMBODIMENTS

The present invention concerns a method and system for processing a sequence of images from an object movie so as to center them about a desired axis. The images are snapshots of multiple orientations of the object. They may be taken from a single camera viewpoint or from multiple camera viewpoints, with a single lens setting or with multiple lens settings, and with the object in a single configuration or in multiple configurations. The present invention provides a way to modify some or all of the images so as to produce a sequence of centered images about a desired axis. The axis may be selected by a user, or automatically determined by a computer.

As an example of a sequence of images, FIGS. 1A–1E illustrate a sequence 100 of images 101, 102, 103, 104 and 105 of an object (a camera) 110, which are off-center due to poor positioning of the object relative to an axis of rotation 130. The object 110 was positioned on a turntable (not shown) and photographed from a single viewpoint as the turntable was rotated. The object 110 was not centered at the axis of rotation 130, which lies behind the object; i.e., the object 110 was sitting at the edge of the turntable, rather than at the center of the turntable. In turn, if these images 101–105 were to be used directly for generating an object movie, the apparent motion of the rotating object 110 to the user would be unpleasant.

FIGS. 2A–2E illustrate a new sequence 200 of images 201, 202, 203, 204 and 205, created from the sequence 100 in FIGS. 1A–1E using a preferred embodiment of the present invention, which are centered about a desired axis of rotation 230. That is, the images 101–105 in FIGS. 1A–1E have been re-rendered on the computer, so as to produce the corresponding images 201–205 in FIGS. 2A–2E. The re-rendered images 201–205 can be used for generating an object movie, and the apparent motion of the rotating object 110 to the user will be pleasant.

Figure 3B:
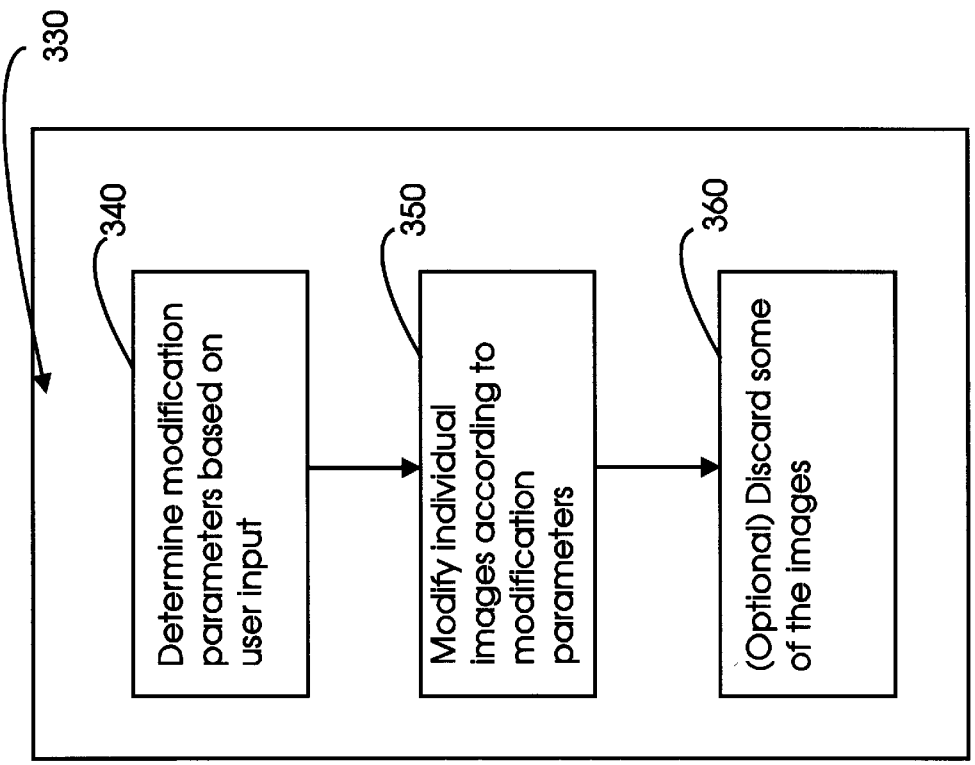
FIGS. 3A and 3B are simplified flowcharts of a preferred embodiment of the present invention.
Figure 3A:
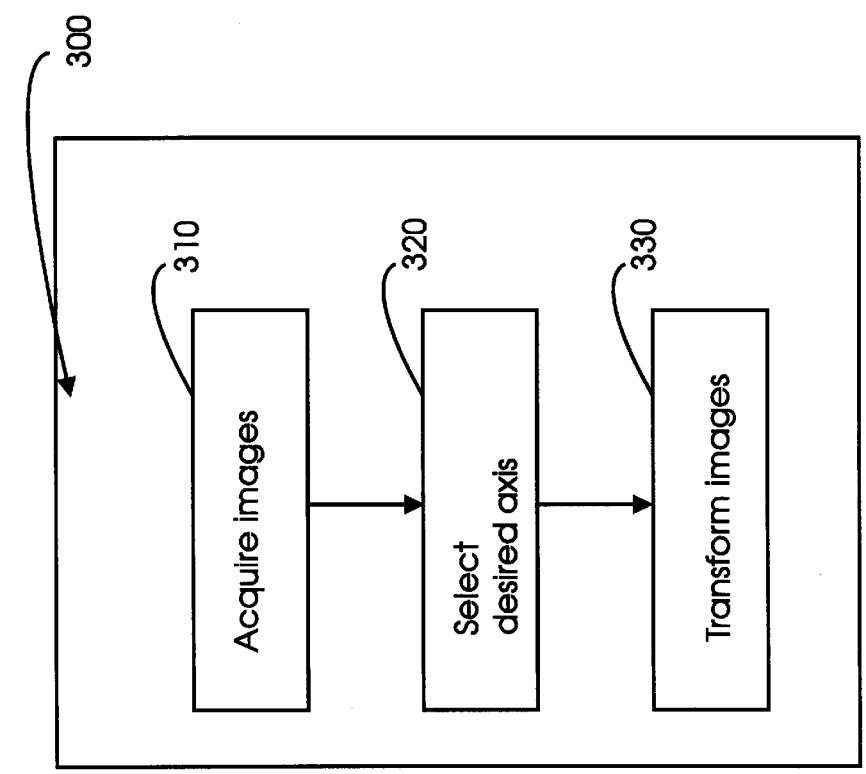

FIG. 3A is a simplified flowchart of a system for centering images in accordance with a preferred embodiment of the present invention. The overall system 300 operates in three steps. The first step 310 involves image acquisition, typically by taking snapshots of plural orientations of a three-dimensional object.

Figure 4:
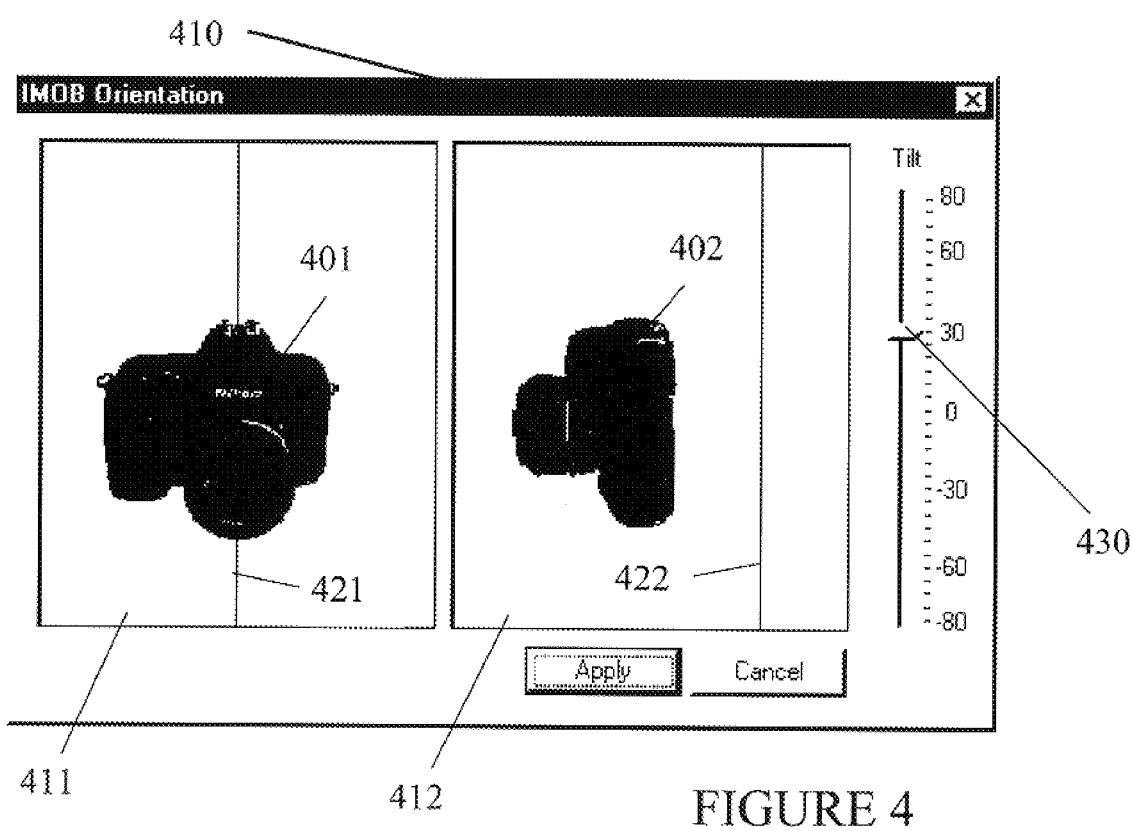
FIG. 4 illustrates a user interface for a computer program which carries out centering in accordance with a preferred embodiment of the present invention.

The second step 320 involves selection of a desired axis. This step can be (i) completely manual, without use of a computer, (ii) semi-automated through a user interface which serves as a computer assist, or (iii) fully automated on a computer, without user intervention. In the completely manual mode, a user mechanically selects the desired axis. In the semi-automated mode, a computer is used as an interface to assist the user in selecting the desired axis. FIG. 4 and its accompanying description below describe a sample graphical user interface that enables the user to select the desired axis by specifying its projections in each of two images. In the fully automated mode, the computer selects the axis without user intervention. For example, the computer could calculate the center of gravity of the object and select the axis which passes through the center of gravity.

In an alternative embodiment step 320 can precede step 310, with the desired axis being selected prior to image acquisition.

The third step 330 is computational, and involves transforming the individual images. FIG. 3B is a simplified flowchart of two major steps and one optional step involved in step 330. At step 340, modification parameters, such as translation vectors and magnification factors, are determined. At step 350 the images are modified by transforming them using transformations, such as translation and magnification, that are determined by the modification parameters. At step 360 some of the images can be discarded, if they cannot be centered together with the others. This step is optional, and may or may not be present in an embodiment of the present invention.

In one embodiment of the present invention, the modifying step 350 involves translating and magnifying the images. Translating involves shifting the pixel values of the image horizontally and vertically. Since the object typically has a simple background, the area where the translated or shifted image leaves the bounds of the original image can be filled in with background color values. Magnification involves zooming in or out of the image, according to a scale factor. Zooming in to a specified image is accomplished by enlarging a desired sub-portion of the specified image to the size of the specified image. Zooming out of a specified image is accomplished by reducing a larger image that contains the specified image to the size of the specified image. Again, the part of the larger image that lies outside the specified image can be filled in with background color values.

In an alternate embodiment of the present invention, the modifying step 350 involves modifications to the images of additional types beyond translation and magnification, such as warping and projection.

FIG. 4 illustrates a user interface for a computer program which carries out centering in accordance with a preferred embodiment of the present invention. Illustrated is a window 410 containing two window panes 411 and 412, displaying respective images 401 and 402 corresponding to two original frames of the object movie. Referring back to FIG. 1, images 401 and 402 are two images from among the original sequence of images 101–105. In each window pane 411 and 412 is also drawn a vertical line 421 and 422, respectively. The vertical lines 421 and 422 indicate the position of a desired axis, as projected onto the view planes of images 401 and 402. The user interface allows these lines to be dragged by a user horizontally, by means of a cursor control device such as a mouse (not shown), to re-adjust their position. The interface operates by having the user manually position each of the vertical lines 421 and 422 into their desired position. The slider 430 at the right side of window 410 indicates the tilt angle of the camera. The user sets this slider 430 to the appropriate angle.

Thus the user is manually performing three settings: the positions of the two vertical lines (desired axis) 421 and 422, and the tilt angle. Once these three settings are determined, a computer can then automatically compute, using the present invention, the new images 201–205 (FIG. 2) from the original images 101–105 (FIG. 1), based upon the settings. The computation proceeds very rapidly, in almost no time at all on today's standard processors.

It is not necessary for the user to make the desired axis setting in every image of the object. In a preferred embodiment of the present invention the user only needs to make the desired axis settings for two of the images, regardless of the number of images being centered. The choice of which two images 401 and 402 to use, from among the original sequence of images 101–105, is arbitrary.

As mentioned above, in an alternative embodiment the position of the axis and the tilt angle of the camera can be automatically computed from the images, without user intervention.

What follows is a technical description of steps 340 and 350 (FIG. 3B); i.e. determining the modification parameters and modifying the images. For purposes of clarity and simplification it is being assumed in what follows that the images under consideration are snapshots of the object from a fixed camera viewpoint, with the object rotating on a turntable about a fixed axis. The present invention provides a system for centering the images so as to re-position the placement of the object relative to a desired axis of rotation, as described above with reference to FIGS. 1A–1E and FIGS. 2A–2E. Software for carrying out a preferred embodiment of the present invention under this assumption is provided in Appendix A.

In this embodiment it is assumed that the images of the object can be approximated by a scaled orthographic projection. This requirement would be met if the images are photographed using a camera with a large focal length; e.g., a zoom lens. Under this assumption, physical camera or object translation corresponds directly to image translation. Specifically, the image which would be obtained by physically translating the object left, right, up or down corresponds to translating the original digital image. Thus centering the rotating object about a new rotation axis is equivalent to translating each digital image by an appropriate amount of translation. In other words, appropriately translating each of the digital images in the original image sequence can produce a new image sequence in which the object appears to be rotating about a different axis.

Thus it can be appreciated that the objective is to determine horizontal (x-axis) and vertical (y-axis) translations, denoted respectively by dx and dy, so that when the images are then translated by these amounts, the desired centering effect is achieved. The appropriate translations dx and dy are functions of the rotation angle, denoted by theta, of each image, and thus vary from image to image. The translations dx and dy for each image can be computed from knowledge of (i) the location of the original axis of rotation, (ii) the rotation angles of each of the individual images in the sequence, and (iii) the three manual user settings—namely, the projected location of the new axis of rotation in each of two images, and the tilt angle of the camera. Details of this computation are presented in the software listing of Appendix A, and described hereinbelow.

Figure 5B:
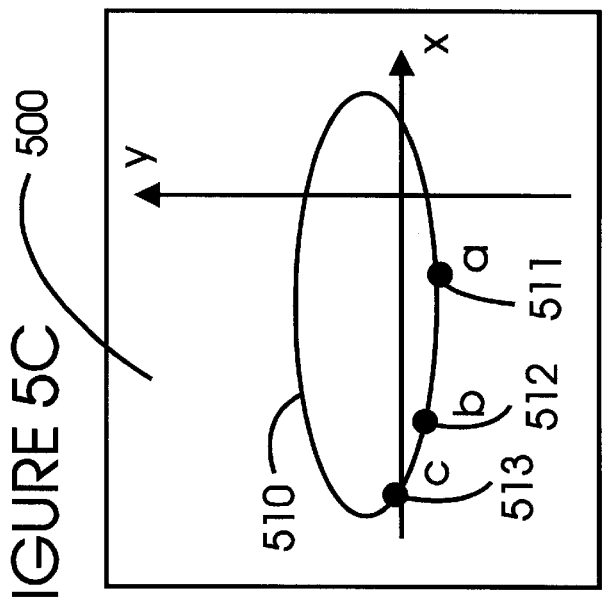
FIGS. 5A–5C are simplified illustrations of the geometry underlying the calculations involved in a preferred embodiment of the present invention.
Figure 5C:
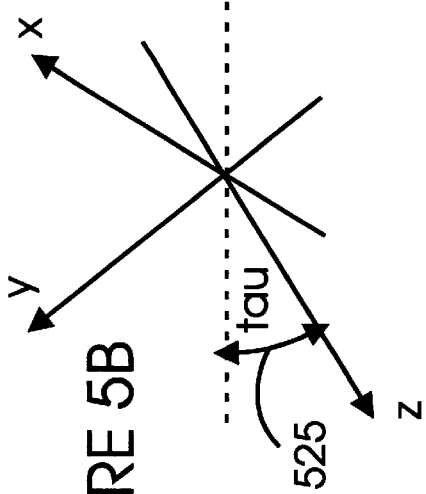
Figure 5A:
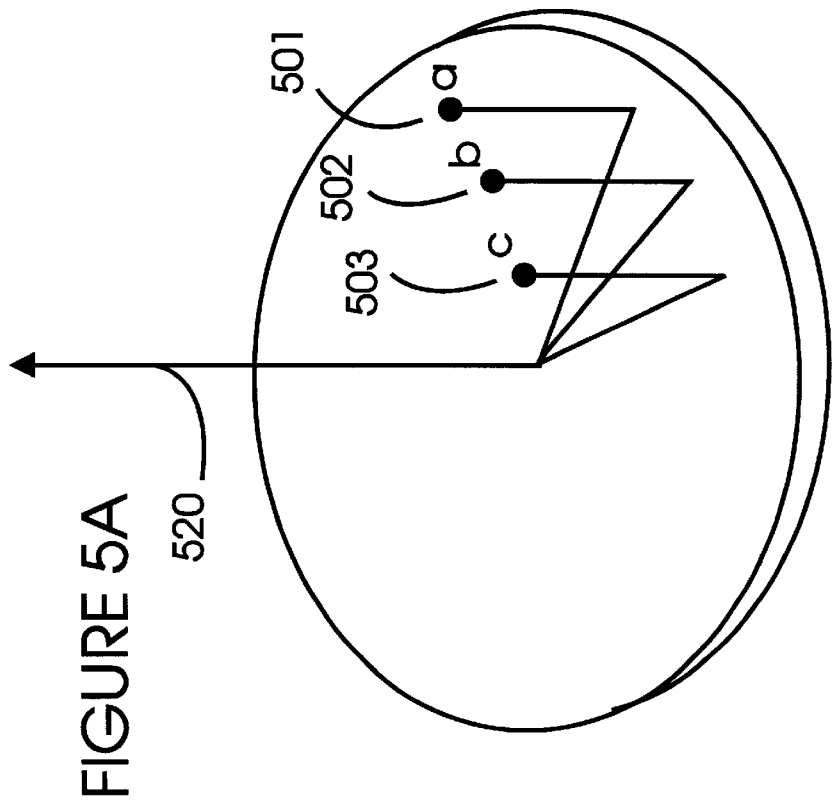

FIGS. 5A–5C are simplified illustrations of the geometry underlying the calculations involved in a preferred embodiment of the present invention, under the assumptions described above. As shown in FIG. 5A, the desired axis of rotation is represented by a single point of reference, 501, denoted by a, which can be any arbitrary but fixed point situated on the desired axis. As shown in FIG. 5B, rotating the desired axis about the original axis of rotation 520 causes point 501 to trace out a curve that projects onto an ellipse 510 in the camera's view plane 500, in which the images are displayed. As shown in FIG. 5C, if the tilt angle of the camera is zero, then the ellipse 510 will degenerate into a line segment; otherwise, the curve will be a non-degenerate ellipse. Specifically, the aspect ratio of the ellipse 510, which is the ratio of its minor axis (not shown) to its major axis (not shown), is given by sin(tau), where tau denotes the tilt angle 525 of the camera.

As the desired axis of rotation is rotated about the original axis of rotation 520, reference point 501 moves to positions indicated by points 502 and 503, denoted by b and c, respectively. The ellipse 510 is the locus of all positions of the reference point, projected onto view plane 500, as the desired axis of rotation undergoes a full revolution. Specifically, positions 501, 502 and 503 project onto positions 511, 512 and 513 within ellipse 510.

In terms of x and y axes, 521 and 522, in view plane 500, the analytical expression for ellipse 510 is given by $$x = x\_orig + r^* \cos(\theta + \omega) \quad (1)$$

$$y = y\_orig + r^* \sin(\tau)^* \sin(\theta + \omega) \quad (2)$$

where r denotes the major semi-axis (not shown) of ellipse 510, x_orig and y_orig denote the coordinates of the center of the ellipse, and omega is the relative phase of the ellipse. It can be seen that the center of the ellipse lies on the projection of the original axis of rotation, so that x_orig is also the position of the projected axis of rotation.

It can be seen that the horizontal displacement between the projections of the desired axis of rotation and the original axis of rotation 520 is precisely the horizontal displacement necessary to center the image about the desired axis. Shifting the projected axis of rotation horizontally in one direction (say, to the right) corresponds to translating the image horizontally in the opposite direction (to the left). Thus it becomes apparent that the sought after translation dx is the negative (i.e. reverse) of the shift of the rotation axis, x-x_orig. Similarly, the sought after translation dy is the negative (i.e. reverse) of y-y_orig. As such, dx and dy are given by the respective expressions $$dx = -r^* \cos(\theta + \omega) \tag{3}$$

$$dy = -r^* \sin(\tau)^* \sin(\theta + \omega) \tag{4}$$

There are only two unknown quantities in these expressions; namely, r and omega. Thus two additional pieces of information are all that is necessary to uniquely determine them.

Considering now those images 401 and 402 (FIG. 4) for which the user manually adjusts the projected axis of rotation, the horizontal translation x-x_orig is simply the amount by which the user horizontally shifts the vertical axis of rotation 411 or 412 (FIG. 4) from its original position. That is, the user settings determine values of x-x_orig at two angles theta. This information suffices to determine r and omega explicitly, and hence, through the abovementioned expressions, to determine the values of dx and dy at any angle theta—which was the objective.

Specifically, if the known information is x_1-x_orig and x_2-x_orig, corresponding to angles of rotation theta_1 and theta_2, then r and omega satisfy the two equations $$r^* \cos(\theta\_1 + \omega) = X1 \tag{5}$$

$$r^* \cos(\theta\_2 + \omega) = X2 \tag{6}$$

where X1=x_1-x_orig and X2=x_2-x_orig. The solutions to these equations are given by $$\tan(\omega) = [X1^* \cos(\theta\_2) - X2^* \cos(\theta\_1)] / [X1^* \sin(\theta\_2) - X2^* \sin(\theta\_1)] \tag{7}$$

$$r = X1 / \cos(\theta\_1 + \omega) \tag{8}$$

More generally, if the values of x-x_orig are known for n images, say, x_i-x_orig are given for the images corresponding to rotation angles theta_i (i=1, 2, . . . , n), where n is at least two, then the parameters r and omega can be computed by a least squares technique, minimizing the sum of squared error expression $$\text{sum } \{[\text{x\_i-x\_orig} - r^* \cos(\theta\_i + \omega)]^2\} \tag{9}$$

where the sum extends over i=1, 2, . . . , n.

It is apparent to persons skilled in the art that if x_orig is unknown, it can also be solved for in addition to r and omega, provided that three (or more) horizontal shifts x_i-x_orig are prescribed by the user. That is, an additional piece of information is necessary, in lieu of knowledge of x_orig.

Appendix A is a listing of software in the C programming language for performing the image processing used to center a sequence of images of an object, in accordance with a preferred embodiment of the present invention. As can be seen, the listing contains two data structures. The first data structure, OrthoCenterParams, stores the input information used to calculate the dx and dy arrays. It contains variables m_xaxis1, x_axis2 and m_tau, corresponding to the three user settings. In addition it contains the angles of rotation, m_theta1 and m_theta2, for the two specific frames 401 and 402 (FIG. 4) for which the user positions the axis of rotation, and it contains the x-coordinate, m_xaxisOrig, of the original rotation axis.

The second data structure, OrthoRenderParams, stores the output information, used in the expressions for calculating the dx and dy arrays in equations (3) and (4) above. It contains the two parameters of the ellipse, m_r and m_omega, along with the tilt angle, m_tau, of the camera. The parameter m_tau appears in both OrthoCenterParams and OrthoRenderParams since it is part of the information from the user input settings, and it is also the aspect ratio of the ellipse used in the expressions from equations (3) and (4) above for calculating the dx and dy arrays.

Three functions are provided in the listing. The first function, OrthoAlign, carries out step 340 from FIG. 3B and calculates the output parameters in pRenderParams from the input parameters in pCenterParams. It finds the optimal values of m_r and m_omega which minimize the sum of squared errors in equation (9). Specifically, the algorithm used in this function is based upon the observation that for a given value of omega, the minimization in equation (9) can be carried out explicitly for r, since the expressions for x and y in equations (1) and (2) depend linearly on r. The explicit formula for r is given by $$r = \text{sum}[(\text{x\_i-x\_orig})^* \cos(\theta\_i + \omega)] / \text{sum}[(\cos(\theta\_i + \omega)^* \cos(\theta\_i + \omega)] \tag{10}$$

where, as in equation (9) above, the sum extends over i=1, 2, . . . , n. For the listing in Appendix A, n=2. By using this explicit expression for r, the minimization problem in equation (9) reduces from a problem in two variables (r and omega) to a problem in one variable (omega).

The function OrthoAlign loops over values of omega ranging from -M_PI to +M_PI in intervals of 0.1, searching for the value of omega which minimizes the sum of squared errors. Whenever a value of omega is found which produces an error, err, which is lower than the current minimum error, minErr, that value of omega is saved in bestOmega and the corresponding value of err is saved in minErr. The value of r given by equation (10) above is also saved in bestR. The best values arrived at by the end of the search are used for m_r and m_omega. The value of m_tau in pRenderParams is simply copied from the value of m_tau in pCenterParams, since they are one and the same.

Alternatively, for the case n=2, the function OrthoAlign could have been written to explicitly solve for r and omega using equations (7) and (8). The present implementation is more general in that it extends to values of n greater than 2; i.e., to user settings for the desired axis of rotation in more than two frames—where there is more information to integrate.

The second function, OrthoRender, carries out step 350 from FIG. 3B and calculates the dx and dy arrays, dxArr [ ] and dyArr [ ], using the variables in renderParams, according to the expressions in equations (3) and (4) above.

The third function, OrthoCenter, combines the first two functions into one function. It carries out both steps 340 and 350 from FIG. 3B, and calculates the dx and dy arrays, dxArr [ ] and dyArr [ ], starting from the input parameters in pCenterParams. As can be seen in the listing, it simply calls OrthoAlign and then OrthoRender. Its effect is to generate the dx and dy arrays directly from the user settings.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for centering a plurality of images which are snapshots of an object seen at a plurality of orientations, comprising:
   computing modification parameters for said images, based upon projected axis adjustment vectors for at least two of said plurality of images; and modifying said images based upon said modification parameters using a computer to center said plurality of images relative to said object.

2. A method according to claim 1 and wherein said projected axis adjustment vectors are horizontal vectors.

3. A method for centering a plurality of images which are snapshots of an object seen at a plurality of orientations, comprising:

computing modification parameters for said images, based upon an axis adjustment vector that is manually set by a user by means of a user interface; and modifying said images based upon said modification parameters using a computer to center said plurality of images relative to said object.

4. A method for centering a plurality of images which are snapshots of an object seen at a plurality of orientations, comprising:

computing modification parameters for said images, based upon an axis adjustment vector that is automatically computed by a computer; and modifying said images based upon said modification parameters using the computer to center said plurality of images relative to said object.

5. A method for centering a plurality of images which are snapshots of an object seen at a plurality of orientations, comprising:

computing modification parameters for said images, comprising calculating major and minor semi-axis lengths and a phase angle for a planar ellipse; and modifying said images based upon said modification parameters using a computer to center said plurality of images relative to said object.

6. A method for centering a plurality of images which are snapshots of an object seen at a plurality of orientations, comprising:

selecting a desired axis, said selecting comprising selecting desired positions for a projected axis in at least two of said images; and modifying said images based upon said desired positions using a computer to center said plurality of images relative to said object.

7. A method for centering a plurality of images which are snapshots of an object seen at a plurality of orientations, comprising:

selecting a desired axis by adjusting a moveable axis by means of a cursor control device; and modifying said images based upon said desired axis using a computer to center said plurality of images relative to said object.

8. A method according to claim 7 and wherein said adjusting is carried out by dragging a vertical line in the horizontal direction.

9. A method for centering a plurality of images which are snapshots of an object seen at a plurality of orientations, comprising:

selecting a desired axis;

specifying a tilt angle by means of a cursor control device and a user interface; and modifying said images based upon said desired axis and said tilt angle using a computer to center said plurality of image relative to said object.

10. A method according to claim 9 and wherein said specifying a tilt angle is carried out by sliding a slider bar.

11. A system for centering a plurality of images which are snapshots of an object seen at a plurality of orientations, comprising:

a processor for computing modification parameters for said images using projected axis adjustment vectors for at least two of said plurality of images; and an image modifier for modifying said images based upon said modification parameters using a computer to center said plurality of images relative to said object.

12. A system according to claim 11 and wherein said projected axis adjustment vectors are horizontal vectors.

13. A system for centering a plurality of images which are snapshots of an object seen at a plurality of orientations, comprising:

a processor for computing modification parameters for said images, using an axis adjustment vector that is manually set by a user by means of a user interface; and an image modifier for modifying said images based upon said modification parameters using a computer to center said plurality of images relative to said object.

14. A system for centering a plurality of images which are snapshots of an object seen at a plurality of orientations, comprising:

a processor for computing modification parameters for said images, using an axis adjustment vector that is automatically computed by a computer; and an image modifier for modifying said images based upon said modification parameters using the computer to center said plurality of images relative to said object.

15. A system for centering a plurality of images which are snapshots of an object seen at a plurality of orientations, comprising:

a processor for computing modification parameters for said images by calculating major and minor semi-axis lengths and a phase angle for a planar ellipse; and an image modifier for modifying said images based upon said modification parameters using a computer to center said plurality of images relative to said object.

16. A system for centering a plurality of images which are snapshots of an object seen at a plurality of orientations, comprising:

an axis selector for selecting a desired axis, wherein said axis selector selects desired positions for a projected axis in at least two of said images; and an image modifier for modifying said images based upon said desired axis using a computer to center said plurality of images relative to said object.

17. A system for centering a plurality of images which are snapshots of an object seen at a plurality of orientations, comprising:

an axis selector for selecting a desired axis comprising a user interface for adjusting a moveable axis; and an image modifier for modifying said images based upon said desired axis using a computer to center said plurality of images relative to said object.

18. A system according to claim 17 and wherein said user interface comprises a cursor control device for said computer.

19. A system according to claim 18 and wherein said cursor control device is used for dragging a vertical line in the horizontal direction.

20. A system for centering a plurality of images which are snapshots of an object seen at a plurality of orientations, comprising:

an axis selector for selecting a desired axis;

an angle specifier comprising a cursor control device and a user interface for specifying a tilt angle; and an image modifier for modifying said images based upon said desired axis and said tilt angle using a computer to center said plurality of images relative to said object.

21. A system according to claim 20 and wherein said angle specifier comprises a slider bar.

* * * * *